Sept. 13, 1949.  E. O. WOLLAN  2,481,964
FAST NEUTRON METER
Filed Oct. 12, 1944
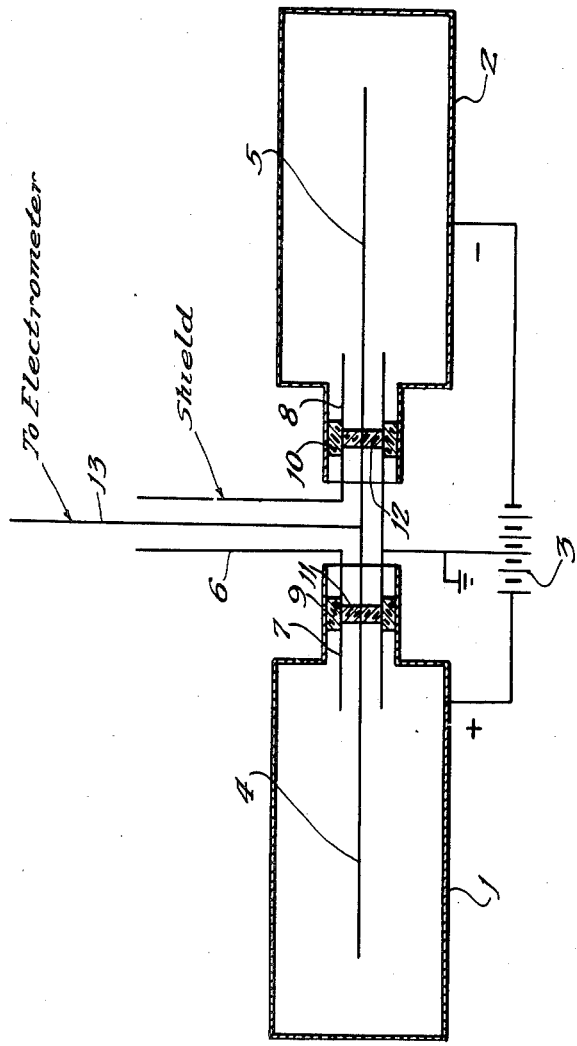
Inventor:
Ernest O. Wollan
By: Robert A. Lavender
Attorney Patented Sept. 13, 1949

2,481,964

UNITED STATES PATENT OFFICE 2,481,964

FAST NEUTRON METER

Ernest O. Wollan, Chicago, Ill.

Application October 12, 1944, Serial No. 558,421

9 Claims. (Cl. 250—83.6)

My invention relates to an apparatus and method for measuring neutron density; more specifically it relates to an apparatus and method of differentiating between the ionization effects caused by neutrons and those caused by gamma rays so as to be able to measure only the intensity of neutrons despite the presence of gamma rays.

In the past, various types of neutron meters and methods of operation have been devised, but in general they have not been found to be suitable for the purposes of the present invention, particularly because of their lack of sensitivity to neutrons due to their lack of differentiating ability between the effects of neutrons and gamma rays.

An object of my invention is to provide an efficient and reliable neutron meter and method of operating the same that is devoid of the above mentioned disadvantages and that will give a reliable indication of neutron intensity, especially fast neutron intensity, even in the presence of substantial gamma ray intensities.

Another object of my invention is to provide a neutron meter that is relatively simple in construction, rugged, and easy to operate.

Other objects and advantages will become more apparent from a study of the following specification taken with the accompanying drawing wherein the single figure is a schematic diagram showing a differential neutron meter embodying the teachings of my invention.

In accordance with the present invention I have been able to measure the intensity of neutrons in the presence of gamma radiation by intercepting a beam of radiation including neutrons and gamma rays with two individual ionization cells both of which are responsive to gamma rays but have unequal ionization response to neutrons. By balancing out the response caused in the one cell it is possible to measure the response in the other cell which is caused by neutrons.

I have provided an especially effective counter which is particularly suited to the measurement of fast neutrons having an energy above about 0.5 mev. in the presence of gamma rays. Such a device comprises a pair of ion chambers one of which is filled with an ionizable gas which is ionized by gamma rays but not by fast neutrons while the other contains a gas or mixture of gases which is responsive to both fast neutrons and gamma rays. In order that the two chambers shall have the same or substantially the same ionization response to gamma rays the pressures within the chambers may be adjusted to compensate for variations in the relative responsive characteristics of the two gases. Gases which have a suitable ionization response to fast neutrons include gaseous elements which have an atomic number up to 4, such as hydrogen, helium or deuterium, and normally gaseous compounds of such elements such as methane, ethane, ethylene, or acetylene.

Referring to the drawing, numerals 1 and 2 denote two separate ion chambers each filled with an ionizable gas, one of which has an ionization response to gamma rays and neutrons and the other of which has an ionization response to gamma rays but no substantial response to neutrons. Numeral 3 denotes a source of energizing potential and is represented as a battery having opposite poles connected to the cylinder walls or electrodes forming chambers 1 and 2. The center of the voltage source 3 is grounded so that the walls of ion chambers 1 and 2 are essentially at opposite potentials with respect to ground and with respect to collecting electrodes 4 and 5 contained within chambers 1 and 2, respectively. A grounded shield 6 has extensions 7 and 8 extending into ion chambers 1 and 2, respectively, which are insulated from the chamber walls by insulators 9 and 10, respectively. Collecting electrode 4 is spaced and insulated from extension 7 by insulator 11, and likewise collecting electrode 5 is spaced and insulated from the extension 8 by means of insulator 12. Extensions 7 and 8 serve as electrostatic shields or guard rings for electrostatically shielding the internal surfaces of insulators 11 and 12 from the effects of high voltage applied between the electrodes of the respective ion chambers. A lead-in conductor 13 is connected to collecting electrodes 4 and 5 and to a grounded electrometer (not shown) of any well-known construction or other current measuring device for the purpose of measuring the differential value of ionization currents developed in ion chambers 1 and 2.

In general, ion chamber 2 is filled with a gaseous medium having an atomic weight of not greater than 4 such as hydrogen, deuterium or helium, or gaseous compounds thereof such as ethylene, methane or ethane or mixtures containing these gases so that ionization from recoil nuclei as caused by fast neutrons bombarding the low atomic weight gas, will occur in chamber 2. On the other hand, ion chamber 1 is filled with gases consisting substantially entirely of elements of higher atomic weight, such as, for example, argon, neon, air, carbon dioxide, etc., which will not undergo any appreciable transfer of energy or produce any appreciable amount of ionization from recoil nuclei as the result of collision with fast neutrons. The chamber 1 is thus free from gases which have an appreciable ionization response to neutrons. After selecting a suitable hydrogen-containing gas (or gas containing other elements having an atomic weight not greater than 4) for chamber 2, it is desirable to choose a gas having substantially the same average atomic weight for chamber 1 so that the ionization response to gamma rays will be substantially the same in both chambers 1 and 2, and that cancellation of these responses may be effected by virtue of the differential connection between the electrodes of the respective ion chambers. However, if gases having different average atomic weights should be used in chambers 1 and 2, the gamma ray response may be made substantially the same by adjusting the relative gas pressures, that is by providing a higher gas pressure for the lower average atomic weight gas filled chamber to maintain the response to gamma rays of the two chambers equal. It is generally desirable to provide in chambers 1 and 2 only gases whose atomic weights are not abnormally high so that equal response to gamma rays will be more readily obtained in both chambers for widely different energy values of gamma radiation. The choice of a particular combination of the above mentioned typical gases preferably should be made as indicated above, namely so that the average atomic weights of the gaseous compositions in chambers 1 and 2 are substantially the same. For example, if $CO_2$ is used in chamber 1, $CH_4$ or $C_2H_4$ are suitable in chamber 2.

The walls of chambers 1 and 2 may be made of any suitable material, such as, for example, aluminum, brass or brass internally lined with aluminum. It is preferable to have the walls of substantially the same atomic weight material which, of course, can be effected by having the walls of chambers 1 and 2 made of the same material, so that the ionization response of the ion chambers 1 and 2 to gamma rays will be substantially the same and substantially independent of the energy of the radiations falling on the ion chambers.

If small ion chambers 1 and 2 are used with relatively low gas pressure, there will be very little ionization occurring at the interior surface of the ion chamber walls. This effect of paucity of ionization immediately adjacent the interior wall surfaces may be compensated for by providing an internal coating of paraffin or other hydrogen-containing material on the inner walls of the ion chambers so that some proton recoils will be provided by the hydrogen of such interior coating. In order to make this coating conductive so as to serve as an electrode, a thin coating of aquadag may be applied thereon. An alternate material for the paraffin and aquadag coating is a hydrogenous, electrically conductive plastic, in which case a suitable material for the walls of chamber 1 would be graphite. In order to overcome the above described "wall effect" and in order to have ionization occur immediately adjacent the interior surfaces of the wall, the gas pressure may be increased, for example, up to as high as 20 atmospheres or even more, and the volumes of the chambers can be considerably increased in which event there will be little or no "wall effect," therefore making it unnecessary to coat the interior surface of chamber 2 with hydrogenous material. In general, it is desirable to make the walls of ion chambers 1 and 2 of a relatively light atomic weight material, such as, for example, aluminum or electrically conducting plastic so that substantially equal response to various energies of gamma radiation will be presented by the chamber walls.

An important consideration in the operation of the above described fast neutron meter is to have ion chambers 1 and 2 substantially equidistant from the radiation source so that the ionization effects due to gamma rays will be the same in both chambers. As a matter of fact, such differential chamber construction is so sensitive to the direction of the gamma ray source that a very slight movement of the source so as to make it slightly closer to one chamber than the other will be readily detected by the electrometer.

In the operation of the device the new meter is placed to intercept a beam of radiation including fast neutrons and gamma rays and is so aligned that the both chambers are substantially equidistant from the source of the beam. Radiation striking ion chamber 2 ionizes the hydrocarbon or similar gas the ionization occurring due to gamma rays and also to nuclear recoil of the hydrocarbon molecules caused by the fast neutrons. Radiation striking chamber 1 causes ionization due to gamma rays and thereby cancels the effect of this type ionization in chamber 2 since the two chambers are differentially connected. However, since the gas in chamber 1 does not undergo appreciable transfer of energy from recoil nuclei as a result of collision with fast neutrons no substantial ionization response to fast neutrons takes place in chamber 1. Consequently the ion response in chamber 2 due to fast neutrons is not cancelled but is transmitted to the lead in conductor and may be amplified and measured in any convenient manner.

Thus it will be seen that I have provided an efficient meter and method of operating the same for measuring only the intensity of fast neutrons even in the presence of gamma rays. It will be apparent that modifications of the above described apparatus will be readily suggested to others skilled in the art after having had the benefit of the teachings of my invention. For example, instead of arranging chambers 1 and 2, as shown, they may be arranged side by side or even concentrically, that is one contained within the other so long as their response to gamma rays is substantially the same. Likewise, other gaseous materials or ionizing media may be used than those described so long as one ion chamber is substantially more responsive to fast neutrons than the other.

While the invention is particularly adapted to measurement of fast neutrons it is not limited thereto since it may be modified and applied to measurement of both fast and slow neutrons. For example, electrode 5 in ion chamber 2 may be coated with a material which becomes radioactive upon bombardment with neutrons such as a thin layer of metallic boron or the chamber may be filled with boron trifluoride. In such a case neutron bombardment of the electrode 5 causes liberation of alpha particles which in turn cause an ionization response which may be measured as previously described.

Although the present invention has been described with particular reference to the specific details of certain embodiments thereof it is not intended that such details shall be regarded as limitations upon the scope of the invention except insofar as included in the accompanying claims.

I claim:

1. Apparatus for measuring neutron intensity and discriminating between the ionization effects of neutrons and gamma rays, comprising two differentially connected ionization chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, one of said chambers containing a gas comprising an element having an atomic weight not greater than 4 and the other containing a gas consisting only of elements which have an atomic weight greater than 4, both of said chambers having substantially equal response to gamma rays.

2. Apparatus for measuring neutron intensity and discriminating between the ionization effects of fast neutrons and gamma rays, comprising two differentially connected ionization chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, only one of said chambers including hydrogen and both of said chambers having substantially equal response to gamma rays.

3. Apparatus for measuring neutron intensity and discriminating between the ionization effects of fast neutrons and gamma rays, comprising two differentially connected ionization chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, only one of said chambers including deuterium and both of said chambers having substantially equal response to gamma rays.

4. Apparatus for measuring neutron intensity and discriminating between the ionization effects of fast neutrons and gamma rays, comprising two differentially connected ionization chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, only one of said chambers including helium and both of said chambers having substantially equal response to gamma rays.

5. Apparatus for measuring neutron intensity and discriminating between the ionization effects of fast neutrons and gamma rays, comprising two differentially connected ionization chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, only one of said chambers including a hydrogen containing material and both of said chambers having substantially equal response to gamma rays.

6. Apparatus for measuring neutron intensity and discriminating the ionization effects of fast neutrons from those of gamma rays, comprising two differentially connected ion chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, both of said chambers having substantially the same response to gamma rays, only one of said chambers including an element having an atomic weight not greater than 4.

7. Apparatus for measuring neutron intensity and discriminating the ionization effects of fast neutrons from those of gamma rays, comprising two differentially connected ion chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, both of said chambers having substantially the same response to gamma rays, only one of said chambers including an appreciable amount of hydrogen so as to cause measurable ionization by proton recoil in said chamber in response to fast neutrons falling thereon.

8. Apparatus for measuring neutron intensity and discriminating the ionization effects of fast neutrons from those of gamma rays, comprising two differentially connected ion chambers, each of said ionization chambers having two electrodes, a first pair of corresponding electrodes of said ionization chambers being connected together and to an output terminal, each one of the second pair of corresponding electrodes of said chambers being respectively connected to opposite polarity terminals of a voltage source, both of said chambers having substantially the same response to gamma rays, only one of said chambers including a gaseous hydrocarbon so as to cause appreciable ionization by proton recoil in said chamber when bombarded by fast neutrons.

9. Apparatus for measuring the relative intensity of fast neutrons comprising an ionization chamber, an ionizable gaseous medium exclusive of hydrogen in any appreciable amount in said chamber, a second ionization chamber, an ionizable gaseous medium in said second chamber including sufficient hydrogen so as to effect a measurable amount of ionization due to proton recoil as the result of fast neutron bombardment thereof, each of said chambers including a central collecting electrode and a surrounding electrode formed from the chamber wall, a source of potential for applying a positive potential to one of said chamber wall electrodes and a negative potential to the other of said chamber wall electrodes, means for interconnecting said collecting electrodes for connection to an electrometer for measuring the differential ionization effects in said chambers due to fast neutrons alone even in the presence of gamma rays both of said chambers having substantially the same response to gamma rays.

ERNEST O. WOLLAN.

REFERENCES CITED

The following references are of record in the file of this patent:

UNITED STATES PATENTS

| Number | Name | Date |
|---|---|---|
| 2,097,760 | Failla | Nov. 2, 1937 |
| 2,161,979 | Rovner | June 13, 1939 |
| 2,288,718 | Kallmann | July 7, 1942 |
| 2,349,753 | Pontecorvo | May 23, 1944 |
| 2,390,433 | Fearon | Dec. 4, 1945 |
| 2,437,476 | Parker | Mar. 9, 1948 |